United States Patent
Doss et al.

(10) Patent No.: US 6,681,412 B2
(45) Date of Patent: Jan. 27, 2004

(54) PTFE MEMBRANE FILTER FOR EXHAUST AIR OF VACUUM TOILET SYSTEM

(75) Inventors: Martin Doss, Buxtehude (DE); Wolfgang Erdmann, Buxtehude (DE); Carsten Ohlfest, Glueckstadt (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 10/232,354

(22) Filed: Aug. 30, 2002

(65) Prior Publication Data

US 2003/0145372 A1 Aug. 7, 2003

(30) Foreign Application Priority Data

Feb. 2, 2002 (DE) .......................................... 102 04 248

(51) Int. Cl.$^7$ .............................................. E03D 11/00
(52) U.S. Cl. ............................ 4/431; 4/321; 4/209 FF; 55/522
(58) Field of Search ...................... 4/431, 321, 209 FF; 55/466, 522, 524

(56) References Cited

U.S. PATENT DOCUMENTS 4,070,714 A * 1/1978 Bishton et al. ................ 4/318
6,077,335 A * 6/2000 Schneider et al. ............ 96/135

* cited by examiner

*Primary Examiner*—Henry Bennett
*Assistant Examiner*—Azadeh Kokabi
(74) *Attorney, Agent, or Firm*—W. F. Fasse; W. G. Fasse (57) ABSTRACT

A filter arrangement for a vacuum toilet system includes a filter element arranged in a filter housing connected to a waste water tank of the vacuum toilet system. The filter element includes a polytetrafluoroethylene (PTFE) filter membrane on the inlet side thereof, a filter support material supporting the PTFE membrane, and a support cage, to form a filter cartridge. The filter is preferably a pleated cylindrical filter with the inlet side on the inside of the cylinder. The arrangement preferably further includes a rinsing nozzle that rinses contaminants from the inlet side surface of the filter element, to flow down into the waste water tank. This rinsing, together with the low adhesion and the surface filtration principle of the PTFE filter membrane, prevent clogging of the filter.

21 Claims, 6 Drawing Sheets

PTFE MEMBRANE FILTER FOR EXHAUST AIR OF VACUUM TOILET SYSTEM

PRIORITY CLAIM

This application is based on and claims the priority under 35 U.S.C. §119 of German Patent Application 102 04 248.9, filed on Feb. 2, 2002, the entire disclosure of which is incorporated herein by reference.

FIELD OF THE INVENTION

The invention relates to a filter arrangement for a vacuum toilet system including at least one filter element for removing liquid and solid contaminants from a volume flow of air, whereby the filter element is arranged in a filter housing that is connected to the top of the waste water tank of the vacuum toilet system.

BACKGROUND INFORMATION

Commercial aircraft for passenger transport are typically equipped with a vacuum toilet system, which includes a waste water tank and at least one toilet and/or other waste disposal receptacles connected to the waste water tank by a waste collection line, and which uses a vacuum suction effect to suck the waste materials that are to be conveyed from the toilet into the waste water tank. This waste material stream or flow is a mixture of cabin air and waste water that comprises the toilet flush water, liquid and solid human waste, and other materials such as toilet paper, tissues, and other wastes that a passenger might dispose of into the toilet. The suction effect is typically created by the pressure difference between the low outside ambient air pressure and the higher interior pressure within the aircraft cabin during flight at typical cruise altitudes. Another possibility for generating the vacuum or suction effect is through the use of a conventional vacuum generator, for example when the aircraft is on the ground or at a low flight altitude which would provide an inadequate pressure differential.

The vacuum toilet system is connected via the waste water tank and through an outlet or exhaust air line to the external environment outside the aircraft. In other words, the outlet or exhaust line is connected from the waste water tank, for example through the vacuum generator or the like, to an overboard exhaust air outlet. The flow of cabin air and waste water is conveyed from the toilets through the collection line into the waste water tank, where the waste water is collected in the tank by the effect of gravity, while the airflow is conveyed out of the tank through the exhaust airline. However, this airflow leaving the waste water tank can still be contaminated with some liquid and solid wastes, for example due to the vigorous intermingling of the air with the solid and liquid wastes during the vacuum transport through the waste collection line. In order to separate and isolate the waste-contaminated portion of the toilet system from the outside exhaust air, and from the devices needed for generating the vacuum pressure differential, it is therefore necessary to provide a filter system for the exhaust air as it leaves the tank.

At present, the conventional filter systems installed in aircraft toilet systems are all embodied as volume, bulk, or storage filters. In other words, the present conventional filter systems all achieve the required filtration in the body volume or bulk of a filter medium. A conventional so-called waste separator comprising such a filter is typically arranged between the waste water tank and the exhaust air line. The contaminated airflow exiting from the waste water tank or the waste collection line is filtered and thereby decontaminated through the waste separator, and the output filtered airflow is then directed through the exhaust air line to the outside environment. Thereby, it is intended that any remaining solid or liquid waste contaminants are filtered out and removed from the airflow by the waste separator.

Figure 1:
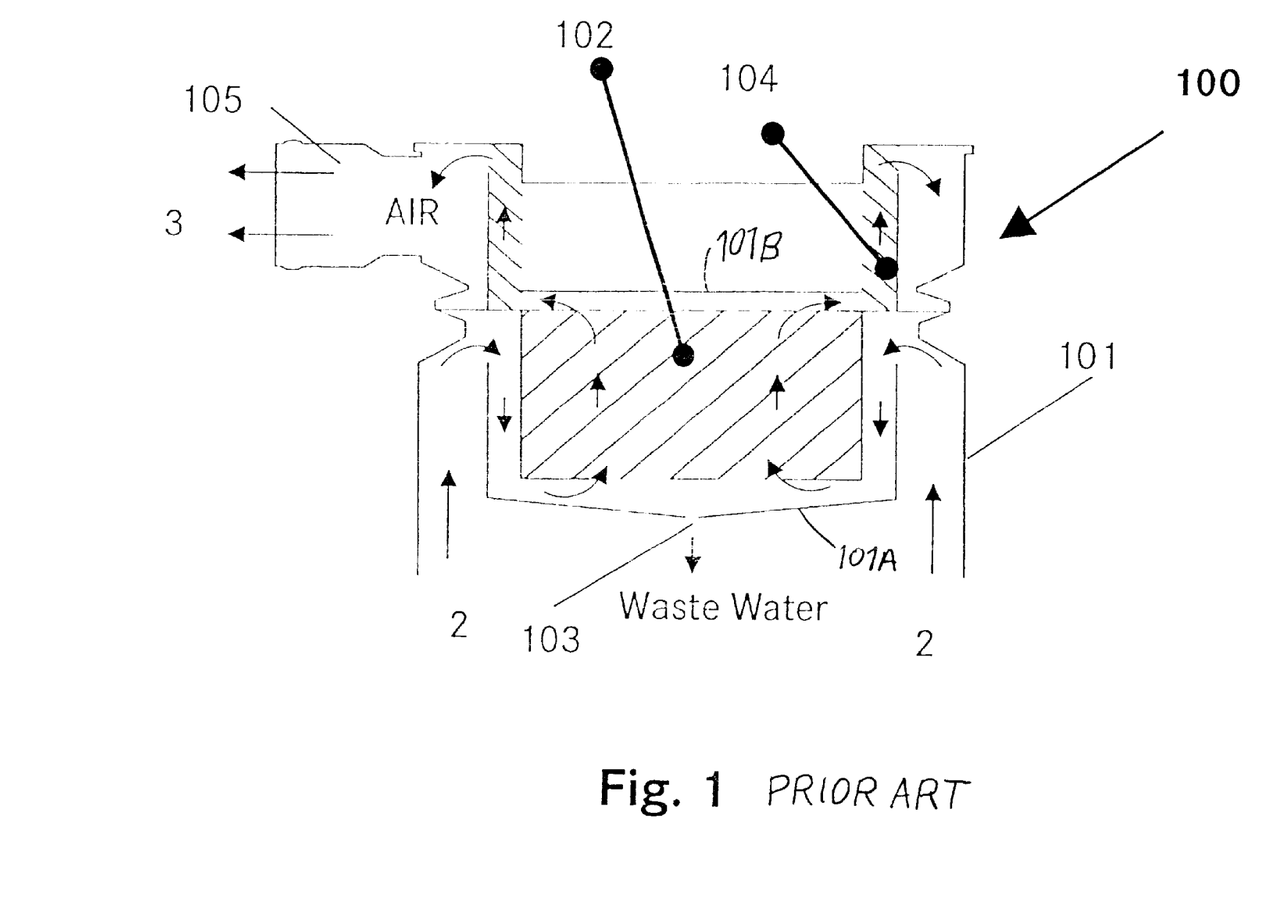
FIG. 1 is a basic schematic sectional view of a conventional filter system for an aircraft waste water system.

In the typical conventional arrangement of such a waste separator 100, e.g. as shown in present FIG. 1, a first filter element 102 consisting of a crimped or random-looped Perlon thread is arranged in a housing 101 including a bottom baffle 101A. This first filter element 102 separates any remaining contaminants, and especially liquid contaminant residues, from the unfiltered contaminant-laden airflow 2, which flows around and then up over the baffle 101A and into the bottom of the filter 102. The separated liquid runs down by the effect of gravity and drains through a small opening 103 in the bottom of the housing 101, i.e. in the bottom of the baffle 101A, back into the waste water tank. Since the conveyed airflow 2 can also be contaminated with small solid contaminant particles of toilet paper, tissues, newspaper, other waste paper, or other similar solid waste materials, such solid particles can be sucked against the bottom inlet surface of the filter element 102, or can be sucked into the bulk volume of the filter element 102, or can become lodged and thus plugged-up in the drain opening 103 of the housing 101.

The conventional arrangement of the waste separator 100 further includes a second filter element 104, consisting of a wound or rolled steel wire braid or mesh, arranged above the first filter element 102. After emerging from the top of the first filter 102, the partially filtered airflow is directed radially outwardly by another baffle 101B and then passes upwardly through the second filter element 104, where it is further cleaned or separated from contaminants. The final resulting filtered airflow 3 is then directed out of the exhaust air line 105.

The conventional filter system described above suffers the substantial disadvantage that it can become clogged, plugged or saturated with waste materials, and especially solid particle waste materials. Namely, as described above, solid waste materials such as paper particles and the like can become sucked onto the surface or into the body or volume of the crimped or crinkled fiber material of the first filter. Over time, the solid waste particles accumulate on the surface and in the body of the filter and begin to plug it up. Any solid waste particles that manage to get through the first filter can then become adhered on and plug the second filter consisting of a steel wire mesh or braid. This plugging of the filter system, which worsens over time, progressively increases the airflow resistance and thus decreases the flow of air through the filter arrangement.

After substantial saturation of the filter has occurred, it becomes impossible to establish a system differential pressure between the toilet and the waste water tank of sufficient strength to reliably convey the waste flow, due to the substantial pressure drop across the filter arrangement. As a result, there is the danger of blockage or plugging of the waste water collection line, which can ultimately lead to the failure of the entire toilet system. Since the conventional filter system cannot be cleaned during use, i.e. during the time it is installed in the toilet system, this progressive plugging or saturation of the filter arrangement cannot be corrected except for carrying out a substantial maintenance procedure of removing and replacing the filter arrangement, which involves substantial cost, effort and downtime of the aircraft.

Another problem is that some small waste particles, both solid and liquid, can permeate entirely through both filter stages, and thus be sucked into the exhaust air outlet line. There, the remaining waste particles will contaminate the mechanical components of the vacuum generator, which could lead to a malfunction or breakdown thereof, or are transported to the overboard outlet where the waste soils the outer skin of the aircraft fuselage.

A further disadvantage, as briefly mentioned above, is that the cleaning or maintenance of the filter system in conventional arrangements requires a substantial effort and expense. The waste water tank(s) with the conventional waste separator arranged thereon is(are) typically installed in the rear tail region behind the rearmost freight or cargo compartment in an aircraft, for example in an Airbus A340 aircraft. It is difficult to access the filter elements that must be cleaned or exchanged, and therefore it becomes necessary to carry out a complicated and time-consuming, and thus costly, disassembly, removal, reassembly and installation of these components at every scheduled maintenance interval that calls for inspection, cleaning, or replacement of the filter elements.

SUMMARY OF THE INVENTION

In view of the above, it is an object of the invention to provide a filter arrangement for a vacuum toilet system, especially for use in a commercial passenger transport aircraft, that has been improved so as to prevent a plugging or clogging and blockage of the filter element and therewith an impairment of the operability of the toilet system. It is a further object of the invention to provide such a filter arrangement having an increased operating lifetime in comparison to a conventional volume or bulk filter, and requiring a reduced effort for cleaning and maintenance procedures. The invention further aims to avoid or overcome the disadvantages of the prior art, and to achieve additional advantages, as apparent from the present specification.

The above objects have been achieved according to the invention in a filter arrangement for a vacuum toilet system, comprising a filter element for separating contaminants from a volume flow and particularly an airflow, arranged in a filter housing that is connected to the top of a waste water tank of the vacuum toilet system. The invention is directed to the filter element by itself, as well as the combination of the filter element with the filter housing and the waste water tank, or the filter arrangement in an overall vacuum toilet system.

Especially according to the invention, the filter element comprises a filter membrane of polytetrafluoroethylene (PTFE) that forms the surface of the filter element on the inlet or inflow side thereof, i.e. the side of the filter element facing the inflowing contaminated airflow. The housing has an outlet through which the cleaned or filtered volume flow is directed out of the filter arrangement, for example into an exhaust air line of the vacuum toilet system. The housing further forms a flow channel between the filter element and the housing wall, on the outlet or outflow side of the filter opposite the inlet side of which the surface is formed by the PTFE filter membrane. This flow channel acts as a plenum and leads and connects to the outlet. The housing has a drain or run-off opening through which contaminants separated from the airflow by the filter element can run back into the waste water tank. The PTFE filter membrane has a surface filtration effect, and a characteristic low adhesion so that contaminants do not adhere onto the filter membrane, but instead easily flow or fall downwardly from the filter element back into the waste water tank.

It is especially advantageous according to the invention, that a plugging or blocking of the filter arrangement can be effectively prevented, and thereby the operability and reliability of the vacuum toilet system cannot be impaired by a plugging or blocking of the filter. Thus, a reduction of the suction effect and ultimately a failure or breakdown of the entire toilet system due to a plugged filter is effectively prevented. Also, the effort and expense for the necessary maintenance measures as well as preventive maintenance inspections can be considerably reduced. Another advantage of the inventive arrangement is that solid and liquid contaminants are very effectively removed from the airflow, so that such contaminants will not be conveyed to and deposited on the outer skin of the aircraft or the components of the vacuum generator.

According to details of inventive embodiments, the filter element may further comprise a carrier material or substrate such as a supporting mesh or fleece of synthetic fibers, which supports and carries the PTFE filter membrane thereon. The PTFE filter membrane is preferably cylindrically configured, and may be folded or pleated in a fan-like manner into the form of a pleated filter so as to increase the filter surface area. The filter membrane may be supported by stabilizers or a support cage, and together therewith may form a unitary filter cartridge that can be easily installed in the filter housing and exchanged when necessary. The filter arrangement may further preferably comprise a cleaning or rinsing device, preferably embodied as a spray head including at least one liquid jet spray nozzle that directs a spray of a rinsing liquid onto the inlet side surface of the filter element, i.e. onto the PTFE filter membrane. Thereby, any solid contaminants adhering on the PTFE filter membrane are easily rinsed off so as to flow down into the waste water thank through the drain opening of the housing.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

FIG. 1 is a basic schematic view of a conventional waste separator 100, which has been described in detail above.

Now, the inventive filter arrangement will be described in comparison to the conventional filter arrangement or waste separator 100, whereby the other components and operation of the vacuum toilet system may correspond to the conventional toilet system as described above.

Figure 2:
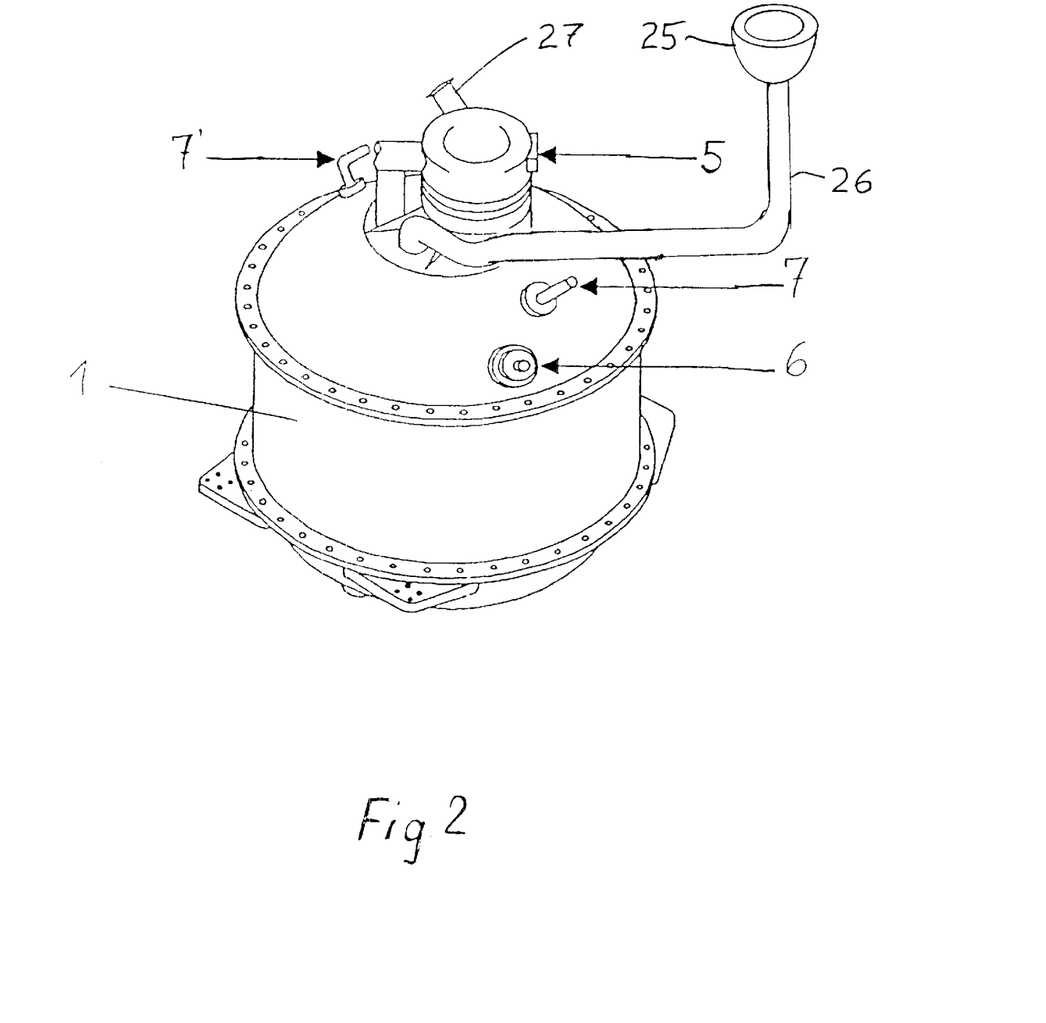
FIG. 2 is a perspective view of a waste water tank of an aircraft waste water system with a filter arrangement according to the invention mounted thereon.

Especially according to the invention, as shown in FIG. 2, the inventive filter arrangement 5 is arranged on the top of a waste water tank 1 of a vacuum toilet system, which further comprises toilets 25, and a waste collection line 26 running from the toilets to the tank 1, as well as an outlet or vacuum exhaust air line 27 running from the tank 1 through a vacuum generator to an overboard outlet to the external environment outside of the aircraft. Generally, the conventional waste separator 100 described above in connection with FIG. 1 is replaced by the inventive filter arrangement 5. In addition to the filter arrangement 5, a fill level sensor 6 as well as tank rinsing or flushing connections 7 and 7' are arranged on the top of the waste water tank 1.

Figure 3:
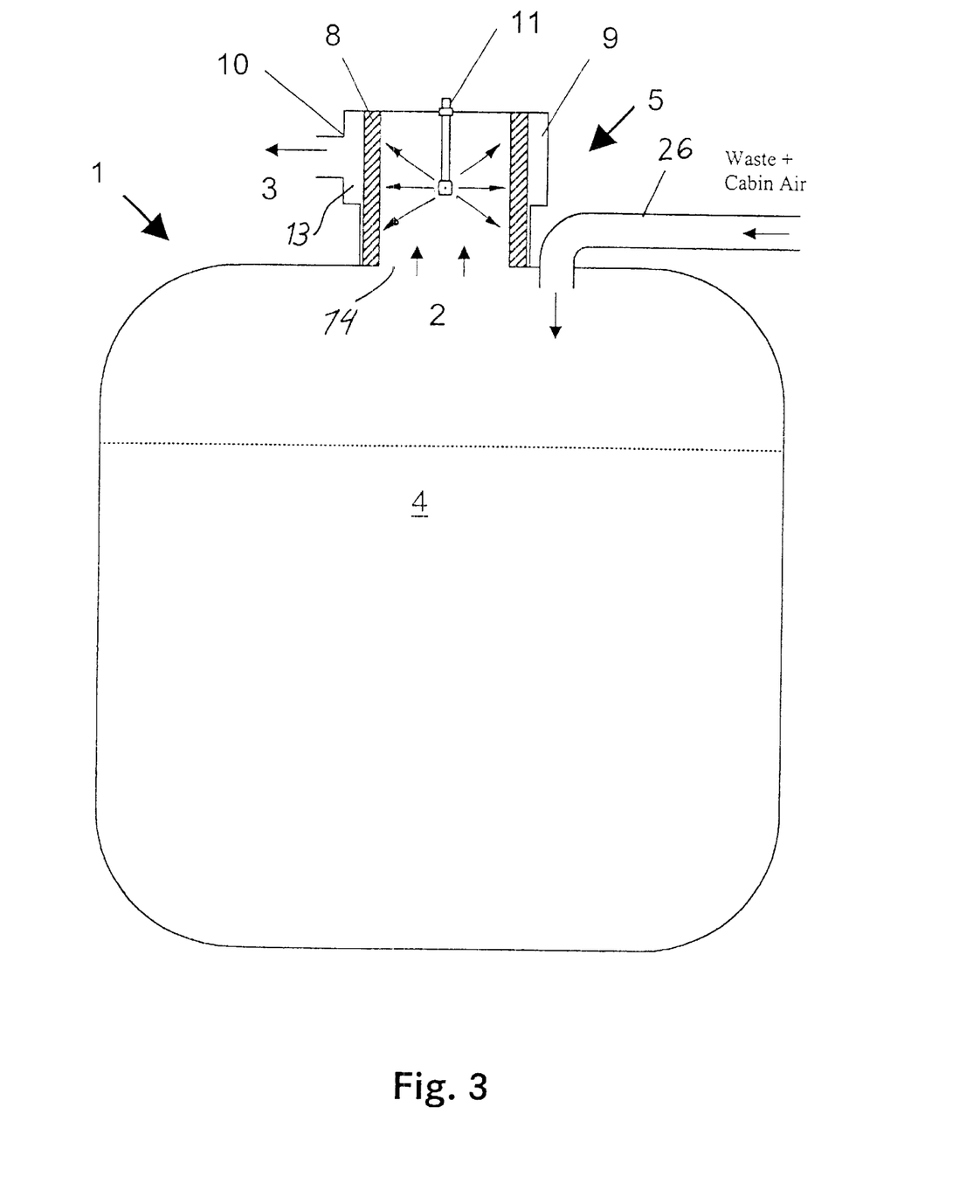
FIG. 3 is a schematic cross-sectional view of the waste water tank with the inventive filter arrangement mounted thereon.

A schematic cross-section of the waste water tank 1 with the filter arrangement 5 installed thereon is shown in FIG. 3. The filter arrangement 5 comprises a preferably cylindrical filter element 8 arranged in a filter chamber formed in a filter housing 9. The filter housing 9 has an outlet 10 that is connected to the exhaust air line. A contaminated volume flow 2 consisting of air and remaining contaminants, such as remaining waste water and/or solid particles, flows axially up through a drain opening 14 at the bottom of the housing 9 and then radially outwardly through the filter element 8, i.e. from the inside to the outside of the cylindrical filter element 8. Thus, the inner surface of the cylindrical filter element 8 forms the inlet side thereof, while the outer cylindrical surface forms the outlet side of the filter element 8.

While the volume flow 2 flows through the filter element 8, the contaminants are separated from the airflow by the filter element 8, and the resulting clean filtered airflow 3 flows through a plenum flow channel 13 formed between the filter housing 9 and the filter element 8, to be emitted from the filter arrangement 5 out through the outlet 10 into the exhaust air line. Meanwhile, the liquid and solid contaminants flow, run or fall downwardly from the influence of gravity back into the waste water 4 in the waste water tank 1 through a large open drain opening 14 at the bottom of the filter arrangement 5. In the event that any contaminants, and especially solid particulate contaminants, remain adhering on the inlet side surface of the filter element 8, these contaminants can be rinsed or flushed off of the filter element 8 by the cleaning device 11, which preferably sprays water or some other rinsing liquid onto the inlet side surface of the filter element 8. Thereby, it is ensured that the contaminants can be flushed from the filter element 8 back down into the waste water tank 1.

Figure 4:
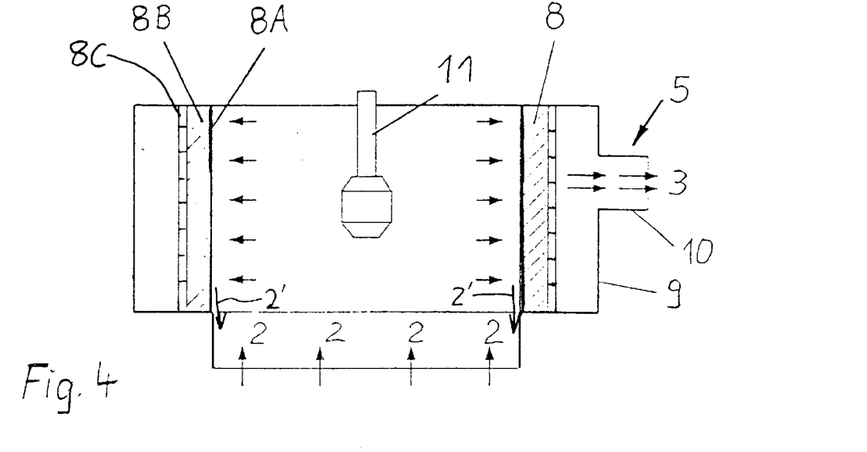
FIG. 4 is a schematic cross-sectional view of the inventive filter arrangement during filtering operation thereof.
Figure 5:
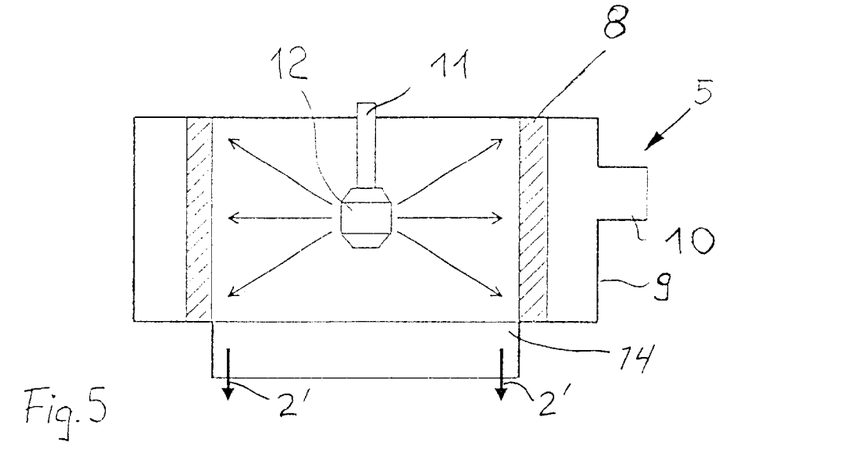
FIG. 5 is a schematic cross-sectional view of the inventive filter arrangement during a filter rinsing phase.

FIGS. 4 and 5 schematically show two different phases of the operation of the inventive filter arrangement 5. Namely, FIG. 4 shows the function or operating phase during flushing operation of the vacuum toilet system (i.e. while an airflow is being sucked through the filter), and FIG. 5 shows the operating phase or function during cleaning maintenance of the filter arrangement 5. During the cleaning function, there is no airflow being sucked through the filter element. In other words, these two phases or operating functions are mutually exclusive.

Figure 6:
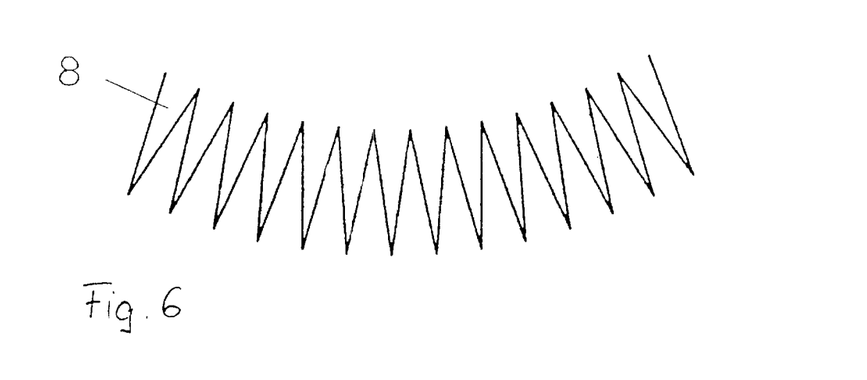
FIG. 6 schematically illustrates a portion of the PTFE filter membrane to show the preferred pleated and cylindrically shaped configuration.

Preferably according to the invention, the filter element 8 is embodied as an exchangeable or replaceable filter cartridge that can easily be installed in the filter housing 9. The filter element 8 is especially a surface filter, i.e. not a volume or bulk filter. The filter material is preferably folded or pleated in a fan-like manner to form a pleated filter cartridge with ribs or pleats to increase the effective surface area thereof, as shown in FIG. 6. However, such pleating of the filter material can be omitted, if a sufficient throughflow surface area is provided by other means, e.g. by a sufficient size of the filter, without such pleats.

According to the invention, the filter element 8 includes a filter membrane 8A made of polytetrafluoroethylene (PTFE) forming the surface of the filter element 8 on the inlet side thereof, i.e. the side facing the inflow of contaminated air. The PTFE filter membrane 8A acts as a surface filter, i.e. the contaminant particles are deposited and separated on the surface of the PTFE membrane without penetrating into a bulk volume of the overall filter element. Particularly, a rather thin (e.g. about 50 $\mu m \pm 10$ $\mu m$) microporous PTFE membrane having micropores establishing passages therethrough is formed by stretching a PTFE material, and this membrane operates according to the principle of surface filtration. The PTFE membrane material is, for example, known and available under the trademarks Gortex™ or Teflon™.

Due to the anti-adhesion properties of the PTFE material, the PTFE filter membrane 8A readily sheds the liquid and solid contaminants 2' that it has filtered out of the airflow 2. Namely, the contaminants 2' do not easily adhere to the PTFE filter membrane 8A. Also, the contaminants 2' do not penetrate into the volume bulk of the filter element as they do in a volume filter, due to the microporous nature of the PTFE membrane. The micro-pores have pore sizes that are the smallest opening sizes throughout the entire filter arrangement, so that all particles to be filtered-out by the filter arrangement are already caught or arrested on the surface of the microporous membrane. Thus, a clogging or plugging of the filter body, as it occurs in a conventional volume filter, cannot arise in the inventive filter arrangement.

The filter element 8 further includes a carrier material or substrate 8B, such as a woven mesh or fabric of synthetic fibers, or a non-woven fleece body or the like, such as a polyester fleece. Since the PTFE filter membrane 8A separates all of the contaminants on its inlet side surface, the contaminants do not penetrate into the body of the carrier material 8B. Furthermore, the filter element 8 may comprise a support cage 8C and/or stabilizers that support and hold the overall filter element 8 in place within the housing. The contaminated volume flow 2 flows first through the PTFE filter membrane 8A on the inner surface of the filter element 8, and thereafter through the carrier material 8B, and then through or past the filter cage 8C or stabilizers. The resulting cleaned or filtered volume flow 3 then passes out through the outlet 10.

As mentioned above, the excellent anti-adhesion characteristics of the PTFE filter membrane 8A ensure that the separated contaminants 2', and especially the liquid contaminant residues, will easily flow down under the influence of gravity from the filter element 8 back into the waste water tank 1. Additionally, a cleaning device 11 is preferably provided in the inventive filter arrangement 5 to rinse off the inlet side surface of the filter element 8, and thereby ensure that any remaining contaminants 2', e.g. solid contaminant particles, that remain adhering to the PTFE filter membrane 8A can be rinsed off and flow back down into the waste water tank 1.

As shown in FIG. 5, the cleaning device 11 is arranged in the open middle of the cylindrical filter element 8 and is supplied with pressurized rinsing water or some other rinsing liquid during a filter maintenance phase. The cleaning device 11 preferably comprises a rotating water jet nozzle 12, which has one or more spray openings directed toward the inner surface of the filter element 8, and preferably oriented so that the water spray of at least a certain water pressure will cause the water nozzle 12 to rotate. Thereby it is ensured that the entire inner surface of the filter element 8 will be effectively sprayed and rinsed clean. The rinsing liquid and the rinsed-off contaminant particles 2' then flow down through the drain opening 14 into the waste water tank 1. This rinsing function can take place under automatic control, for example at regular rinsing intervals, or when a vacuum pressure drop exceeding a certain threshold is detected across the filter element 8. Thereby, a significant contamination and plugging of the filter can be very reliably prevented, and the regular maintenance intervals including a time-consuming exchange of the filter element 8 can be considerably increased.

Figure 7:
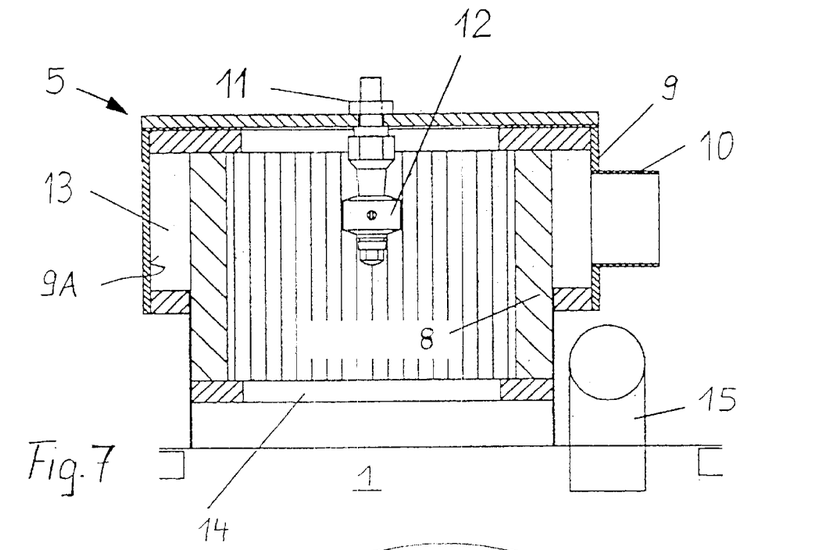
FIG. 7 is a cross-sectional view of a first embodiment of an inventive filter arrangement with a filter cleaning device, installed on top of the waste water tank.
Figure 8:
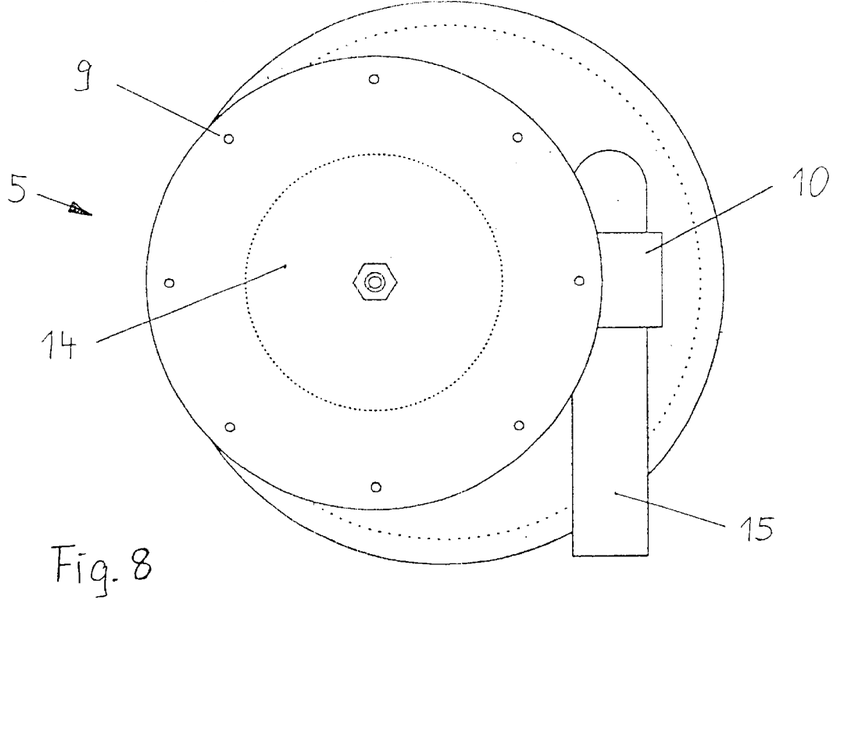
FIG. 8 is a top plan view of the inventive filter arrangement according to FIG. 7 installed on top of the waste water tank.

Further details of the inventive filter arrangement 5 are shown in FIGS. 7 and 8, respectively in a cross-section and a top plan view. The generally cylindrical filter housing 9 is arranged on the top of the waste water tank 1. The cylindrical filter element 8 is inserted into the filter chamber of the filter housing 9, whereby a flow channel 13 remains between the housing wall 9A and the outer surface of the filter element 8, to act as a plenum or manifold for directing the outflow of the filtered volume flow 3 to the laterally arranged outlet 10. The waste-laden volume flow 2 enters the waste water tank 1 through the waste inlet 15. The volume flow 2, which still carries some contamination, then enters the interior of the filter arrangement 5 through the large drain opening 14 at the bottom of the filter housing 9, to then be filtered and flow outwardly through the filter element 8 as described above. The drain opening 14 also serves to allow the filtered or separated contaminants 2' to flow down from the filter element 8 back into the waste water tank 1. For this purpose, the drain opening 14 has a large opening size, for example an opening diameter of at least 75% of the inner diameter of the filter element 8.

Figure 9:
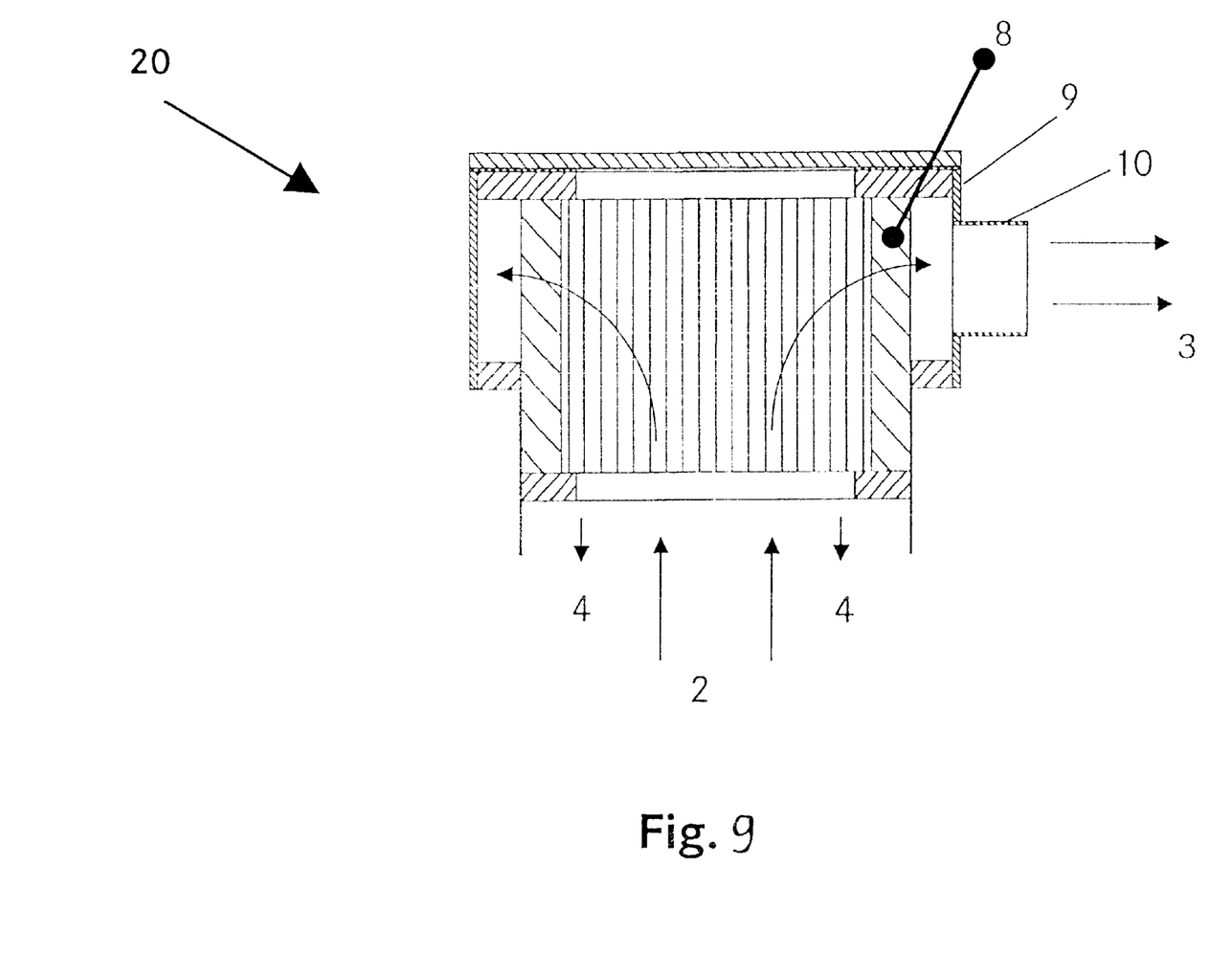
FIG. 9 is a schematic sectional view of a second embodiment of an inventive filter arrangement without a cleaning device.

FIG. 9 shows a second example embodiment 20 of the filter arrangement according to the invention. The principle difference between this embodiment and the embodiment described above is that the cleaning device 11 has been omitted. All of the other structural, functional and operational details of this embodiment correspond to those above, and will not be described again here. By providing the PTFE filter membrane 8A according to the invention, it is possible to achieve significantly improved filter characteristics and functionality relative to the previous conventional filters, even without the use of a rinsing or cleaning device. This is achieved because the PTFE filter membrane acts as a surface filter, and thus avoids the problems of a bulk or volume filter as discussed above. Also, the low-adhesion properties of the PTFE membrane readily shed the contaminants that are filtered out of the volume flow through he filter.

The present embodiment 20 is especially suitable for retrofitting into previously existing vacuum toilet systems, because there is no need to provide an additional water connection or the like for a cleaning device 11. The inventive filter arrangement 5, and particularly the inventive filter element 8, can simply be installed in the previously existing filter housing as a replacement for the previous filter elements. Due to the anti-adhesion properties of the PTFE filter membrane, the inner filter surface becomes only slightly soiled or contaminated with accumulated particles, and these particles can be easily rinsed from the filter surface during maintenance inspections. Thereby, the total exchange or replacement of the filter element 8 is only required at rather long time intervals.

Although the filter element has been described in detail with a cylindrical shape, it could alternatively have a flat planar shape of square, rectangular, round or other format. Preferably, the filter element is arranged with the inlet surface thereof extending substantially vertically. Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. In a vacuum toilet system including a waste water tank, a toilet, a waste collection line connecting said toilet to said tank, a vacuum exhaust line, and a filter arrangement connected to said tank and interposed between said vacuum exhaust line and said tank, an improvement wherein said filter arrangement comprises:

a filter housing arranged on said tank, wherein said housing comprises a housing wall bounding a flow channel, a vacuum exhaust outlet communicating from said flow channel to said vacuum exhaust line, and a drain opening communicating downwardly from said housing into said tank; and a filter element arranged in said filter housing, wherein said filter element has an outlet side surface and opposite thereto an inlet side surface, said outlet side surface bounds said flow channel with said flow channel between said housing wall and said filter element, said inlet side surface communicates with said drain opening, said filter element comprises a polytetrafluoroethylene (PTFE) filter membrane at said inlet side surface thereof, and said filter element is arranged so that contaminants filtered by said filter element out of a volume flow that flows through said filter element from said inlet side surface to said outlet side surface can run from said filter membrane through said drain opening into said tank.

2. The improvement in said vacuum toilet system according to claim 1, wherein said filter element further comprises a filter support material that has said filter membrane arranged thereon so as to support said filter membrane, and that is arranged toward said outlet side surface relative to said filter membrane.

3. The improvement in said vacuum toilet system according to claim 2, wherein said filter support material comprises a woven mesh of synthetic fibers.

4. The improvement in said vacuum toilet system according to claim 2, wherein said filter support material comprises a polyester fiber fleece.

5. The improvement in said vacuum toilet system according to claim 2, wherein said filter element further comprises a filter support cage that supports said filter support material on said outlet side surface of said filter element, and wherein said filter membrane, said filter support material, and said filter support cage together form a unitary filter cartridge that can be inserted into and removed from said filter housing as a unit.

6. The improvement in said vacuum toilet system according to claim 1, wherein said filter element further comprises a filter support cage that supports said filter membrane on said outlet side surface of said filter element, and wherein said filter element is a unitary filter cartridge including said filter membrane and said filter support cage, which can be inserted into and removed from said filter housing as a unit.

7. The improvement in said vacuum toilet system according to claim 1, wherein said filter element has an overall cylindrical configuration.

8. The improvement in said vacuum toilet system according to claim 7, wherein said inlet side surface of said filter element faces radially inwardly into a hollow interior of said cylindrical configuration, said outlet side surface of said filter element faces radially outwardly, and said filter element is arranged in said filter housing with a central axis of said cylindrical configuration oriented vertically.

9. The improvement in said vacuum toilet system according to claim 8, wherein said drain opening is directly below and communicates directly into said hollow interior of said cylindrical configuration of said filter element, and wherein a flow path for the volume flow through said filter arrangement extends vertically axially upward from said waste water tank through said drain opening and into said hollow interior, and then from said hollow interior radially outwardly through said filter element to said flow channel, and then from said flow channel out through said vacuum exhaust outlet.

10. The improvement in said vacuum toilet system according to claim 7, wherein said drain opening has an open diameter of at least 75% of an inner diameter of said cylindrical configuration of said filter element.

11. The improvement in said vacuum toilet system according to claim 1, wherein at least said filter membrane of said filter element is pleated.

12. The improvement in said vacuum toilet system according to claim 1, wherein said filter membrane is about 50 $\mu$m thick and has micropores forming passages therethrough.

13. The improvement in said vacuum toilet system according to claim 1, wherein said filter membrane is a surface filter that filters out the contaminants from the volume flow on a surface of said filter membrane that forms said inlet side surface of said filter element, and wherein said filter arrangement does not include any bulk volume filter.

14. The improvement in said vacuum toilet system according to claim 1, wherein said filter arrangement further comprises a cleaning device adapted and arranged to clean a surface of said filter membrane that forms said inlet side surface of said filter element.

15. The improvement in said vacuum toilet system according to claim 14, wherein said cleaning device includes at least one spray nozzle oriented and adapted to spray a rinsing liquid onto said surface of said filter membrane, so as to rinse contaminants from said surface of said filter membrane with said rinsing liquid downwardly through said drain opening into said waste water tank under the influence of gravity.

16. The improvement in said vacuum toilet system according to claim 15, wherein said spray nozzle comprises a rotatable water jet spray nozzle.

17. The improvement in said vacuum toilet system according to claim 1, wherein said filter element further comprises a filter support material that supports said filter membrane and that comprises a woven mesh or a non-woven fleece of synthetic fibers.

18. The improvement in said vacuum toilet system according to claim 17, wherein said filter element further comprises a support cage or stabilizers that mechanically support and maintain a shape of said filter element, and wherein said filter element is a unitary filter cartridge including said support cage or stabilizers, said filter support material, and said filter membrane permanently joined together.

19. The improvement in said vacuum toilet system according to claim 1, wherein said filter element has an overall cylindrical configuration, and at least said filter membrane of said filter element is pleated.

20. The improvement in said vacuum toilet system according to claim 1, wherein said filter membrane has a thickness of about 50 $\mu$m and has micropores forming passages therethrough, and is effective as a surface filter to remove the contaminants from the volume flow on said inlet side surface of said filter element as said volume flow passes through said micropores of said filter membrane.

21. The improvement in said vacuum toilet system according to claim 1, further comprising a liquid spray nozzle arranged to spray a rinsing liquid onto said filter membrane on said inlet side surface of said filter element.

* * * * *